June 12, 1956 W. S. MELVILLE 2,750,454
ELECTRIC AMPLIFIER
Filed Dec. 17, 1952

Inventor:
William S. Melville,
by Paul A. Frank
His Attorney.

United States Patent Office 2,750,454
Patented June 12, 1956

2,750,454

ELECTRIC AMPLIFIER

William S. Melville, Rugby, England, assignor to The British Thomson-Houston Company Limited, a British company Application December 17, 1952, Serial No. 326,389

Claims priority, application Great Britain December 20, 1951

8 Claims. (Cl. 179—171)

This invention relates to an electric amplifier incorporating as the controlling element a capacitor with a saturable dielectric.

One object of the invention is to provide a simple, sturdy and dependable electric amplifier which does not require the use of inherently fragile electric discharge devices or expensive magnetic saturable reactors as the control element of the circuit.

Another object of the invention is to provide an electric amplifier which uses a saturable capacitor as the control element and which requires no external or auxiliary bias to maintain the saturable capacitor at a desired point along its charge density versus electric force saturation curve. More specifically, a further object of the invention is to provide a saturable capacitor controlled amplifier which is "self-saturating" such that the saturable capacitor is inherently biased, and its time of saturation controlled, by the components of the circuit itself.

In accord with the invention, a capacitor assembly or network including the saturable dielectric capacitor is connected in parallel with a rectifier. The parallel circuit thus formed is adapted to be connected in parallel with an electric load such as an electric utilization device or circuit and with a varying or alternating voltage source. The direct current component of the pulsating voltage developed across the load as a result of the rectifying action of the rectifier provides the self-saturating or biasing voltage for the saturable capacitor. A unidirectional control voltage applied across a portion of the capacitor network then controls the point of the alternating voltage supply cycle at which the capacitor becomes saturated and thus controls the amount of current passing to the load.

The novel features which are believed characteristic of the invention are set forth in the appended claims. The invention itself together with further objects and advantages thereof can best be understood by referring to the following description taken in connection with the accompanying drawing in which Fig. 1 is a circuit diagram of an amplifier embodying the invention while Fig. 2 is a charge density versus electric force curve for the dielectric material employed in the saturable capacitor included in the circuit of Fig. 1.

Figure 1:
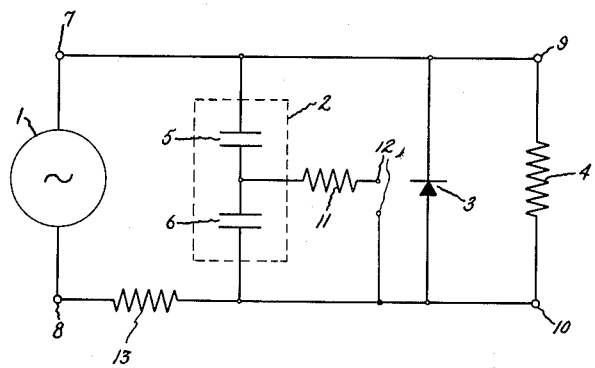

Referring to Fig. 1, an amplifier in accord with the present invention is shown as comprising a capacitor network or assembly 2 including a saturable capacitor 5 and a non-saturable control capacitor 6 connected in parallel with a rectifier 3 as shown. This parallel connected capacitor-rectifier network is adapted to be connected through input terminals 7 and 8 to a source of periodically varying current shown as an alternating current generator 1, and is also adapted to be connected through output terminals 9 and 10 to an electric load 4 represented by a resistor. Electric load 4 is preferably of the type capable of being energized by a unidirectional voltage or current. The input control or signal voltage is supplied across non-saturable capacitor 6 preferably through a current limiting resistance 11 connected from one signal input terminal 12 to the mid-connection between capacitors 5 and 6. A current limiting resistance 13 may also be connected in series with the alternating current source 1 if necessary in order to protect source 1 from the direct short circuit provided in one direction by rectifier 3.

Saturable capacitor 5 in its unsaturated state has an impedance that is low compared with that of load 4, but has an impedance in the saturated state that is high compared with that of load 4. Capacitor 6 is linear capacitor of low voltage rating and of high capacitance compared with the voltage rating and capacitance of capacitor 5 in the unsaturated state.

Figure 2:
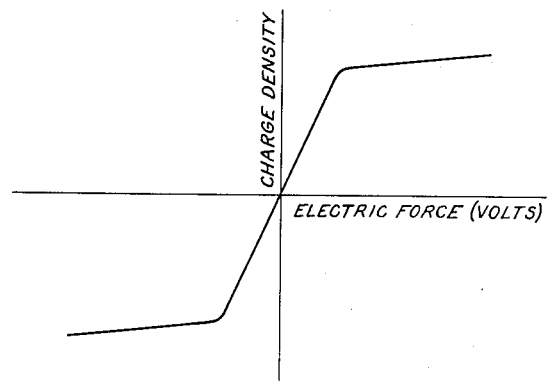

Saturable capacitor 5 has a dielectric material with a non-linear charge density versus electric force curve such as shown in Fig. 2. In this figure, electric force is plotted as the abscissa and charge density corresponding to the "saturation" or "polarization" characteristic is plotted as the ordinate. For small values of electric force, the resulting charge density varies sharply and substantially linearly, but as the electric force is increased the dielectric material becomes saturated and the slope of the characteristic decreases quite rapidly. Saturable dielectric materials which have been found convenient for use in such saturable capacitors 5 are ceramics of the alkaline earth titanates such as barium titanate as well as single crystals of barium titanate. These dielectric materials have a very high dielectric constant and high normal capacitance in the unsaturated state but a low dielectric constant and low capacitance in the saturated state. Accordingly, in an alternating current circuit the unsaturated impedance of the capacitor is very low while its saturated impedance is very high. The construction of such barium titanate capacitors is now well-known to the art and need not be further described here.

In the operation of circuit of Fig. 1, rectifier 3 provides a low impedance path for current tending to pass through the load in one direction and thus produces a direct current component of the voltage developed across load 4. This direct current component appears across saturable capacitor 5 and provides a self-biasing or "self-polarization" of saturable capacitor 5 to a determinable operating point upon its charge density versus electric force characteristic curve. In the absence of a control signal applied across capacitor 6, this self-bias determines the point of the alternating current cycle at which capacitor 5 becomes saturated and thus determines the amount of current which passes to the load 4. When a unidirectional control voltage is applied across capacitor 6 from input terminal 12 through current limiting resistor 11, the mean or average charge density level of the saturable capacitor is varied from this self-biased condition. The point of the alternating current supply cycle at which the capacitor 5 becomes saturated likewise varies. The amount of current from source 1 passing to load 4 is thus determined in accord with the amplitude of this unidirectional control voltage. The average direct current flowing in load 4 and the average voltage developed across load 4 are, therefore, proportional to the unidirectional signal voltage applied across the control capacitor 6.

The amplification factor of the circuit will of course be determined by the relative values of the circuit component, and particularly by the relative impedances of capacitor network 2 and load 4.

Although I have described above a particular embodiment of the invention, many modifications may be made. I intend, by the appended claims, to cover all such modifications as fall within the true spirit and scope of the invention.

What I claim as new and desire to secure by Letters Patent of the United States is:

1. In combination, an electric load adapted to be connected to an alternating current source, an amplifier connected across said load comprising a capacitor network and a rectifier connected in parallel, said capacitor network comprising a saturable capacitor and a non-saturable capacitor connected in series, and conductors for applying a unidirectional signal voltage across the non-saturable capacitor.

2. In combination, a direct current utilization load and current limiting means connected in series and adapted to be connected across an alternating current source, a rectifier connected in parallel with said load, a capacitor network also connected in parallel with said load, said capacitor network comprising a saturable capacitor and a non-saturable capacitor connected in series, and conductors for supplying a unidirectional signal voltage across said non-saturable capacitor.

3. In combination, a direct current utilization device and current limiting means connected in series and adapted to be connected across an alternating voltage source, a rectifier connected in parallel with said device, a capacitor network also connected in parallel with said device, said capacitor network comprising a first capacitor having high capacitance for small amplitude applied voltages and low capacitance for large amplitude applied voltages and a second capacitor having a substantially constant high capacitance for both small and large applied voltages, and conductors for supplying a unidirectional signal voltage across said second capacitor.

4. An electric amplifier comprising a capacitor network including a saturable capacitor and a non-saturable capacitor connected in series, a rectifier connected in parallel with said capacitor network, and electric conductors for connecting said capacitor network to an alternating current source and to an electric load whereby a unidirectional voltage applied across one of said capacitors controls the current passing from the current source to the electric load.

5. An electric amplifier comprising a capacitor network including a saturable capacitor and a non-saturable capacitor connected in series, conductors for supplying a unidirectional signal voltage across said non-saturable capacitor, and a rectifier connected in parallel with said network whereby the unidirectional component of a voltage developed across an electric load connected in parallel with said rectifier may be controlled by said signal voltage.

6. An electric amplifier comprising a capacitor network comprising a saturable capacitor and a non-saturable capacitor connected in series, input signal voltage terminals connected across said non-saturable capacitor, a rectifier connected in parallel with said network, alternating current input terminals connected across said network, and direct current output terminals connected across said rectifier.

7. In combination, an electric load and current limiting means connected in series and adapted to be connected across an alternating current source, an amplifier connected across said load comprising a capacitor network and a rectifier connected in parallel, said capacitor network comprising a saturable capacitor and a non-saturable capacitor connected in series, and conductors for applying a unidirectional signal voltage across the non-saturable capacitor.

8. In combination, an electric load connected for energization from an alternating current source, rectifier means connected in parallel with said load, a capacitor network comprising a plurality of capacitors connected in series at least one of which is a saturable capacitor, said capacitor network also being connected in parallel with said load, whereby the direct current component of the voltage developed across said load by said rectifier means provides biasing voltage for said saturable capacitor, and means for applying a signal voltage to said capacitor network.

References Cited in the file of this patent

UNITED STATES PATENTS

| 2,191,315 | Guannella | Feb. 20, 1940 |
| 2,470,893 | Hepp | May 24, 1949 |
| 2,611,039 | Hepp | Sept. 16, 1952 |

OTHER REFERENCES

"Dielectric Amplifier Fundamentals" by Vincent, from "Electronics," vol. 24, Issue 12, pp. 84–88. Pub. Dec. 1951.